United States Patent
Biran et al.

(10) Patent No.: US 7,496,698 B2
(45) Date of Patent: Feb. 24, 2009

(54) SYSTEM AND METHOD FOR EFFICIENT IMPLEMENTATION OF A SHARED RECEIVE QUEUE

(75) Inventors: Giora Biran, Zichron-Yaakov (IL); John Lewis Hufferd, San Jose, CA (US); Zorik Machulsky, Gesher Haziv (IL); Vadim Makhervaks, Austin, TX (US); Renato John Recio, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 463 days.

(21) Appl. No.: 11/086,713

(22) Filed: Mar. 22, 2005

(65) Prior Publication Data

US 2006/0218316 A1    Sep. 28, 2006

(51) Int. Cl.
*G06F 3/00* (2006.01)
*G06F 5/00* (2006.01)

(52) U.S. Cl. .................. 710/52; 710/54; 710/310; 713/1; 713/100; 709/228

(58) Field of Classification Search ............... 710/52, 710/54, 310; 713/1, 100; 709/228
See application file for complete search history.

(56) References Cited

U.S. PATENT DOCUMENTS

| | | | | |
|---|---|---|---|---|
| 5,751,993 A | * | 5/1998 | Ofek et al. | 711/136 |
| 6,230,228 B1 | * | 5/2001 | Eskandari et al. | 710/310 |
| 6,327,625 B1 | * | 12/2001 | Wang et al. | 709/235 |
| 6,370,626 B1 | * | 4/2002 | Gagne et al. | 711/154 |
| 6,832,310 B1 | * | 12/2004 | Bailey et al. | 713/1 |
| 7,010,607 B1 | * | 3/2006 | Bunton | 709/228 |
| 7,089,378 B2 | | 8/2006 | Chadalapaka et al. | |
| 2004/0037313 A1 | * | 2/2004 | Gulati et al. | 370/465 |
| 2004/0042448 A1 | * | 3/2004 | Lebizay et al. | 370/362 |

* cited by examiner

*Primary Examiner*—Niketa I Patel
*Assistant Examiner*—Steven G Snyder
(74) *Attorney, Agent, or Firm*—Duke W. Yee; Diana L. Roberts-Gerhardt; Lisa L.B. Yociss

(57) ABSTRACT

A method, computer program product, and a data processing system for posting and retrieving WQEs to a shared receive queue in a manner that alleviates head-of-line blocking issues is provided. The present invention provides a shared receive queue and a posting routine for allowing non-sequential work request postings in the shared receive queue. Additionally, a fetch routine is provided for non-sequential fetching of work queue elements from the shared receive queue.

24 Claims, 5 Drawing Sheets

SYSTEM AND METHOD FOR EFFICIENT IMPLEMENTATION OF A SHARED RECEIVE QUEUE

BACKGROUND OF THE INVENTION

1. Technical Field

The present invention relates generally to an improved data processing system. More particularly, the present invention relates to a mechanism for an efficient implementation of a shared receive queue.

2. Description of Related Art

InfiniBand and remote direct memory access (RDMA) protocols provide a message passing mechanism which can be used for Input/Output (I/O) devices and interprocess communications between computing nodes. Consumers access Infiniband message passing hardware by posting send and receive messages to respective send and receive work queues (WQs) on an Infiniband channel adapter. The send/receive work queues are assigned to a consumer as a queue pair. Consumers retrieve the results of these messages from a completion queue (CQ) through the Infiniband send and receive work completions.

RDMA extends the Infiniband semantics to allow sharing a single receive queue between several connections. A shared receive queue (SRQ) allows sharing of buffer resources between multiple connections and facilitates minimizing the overall size of the buffers needed to be posted to sustain a particular throughput.

In non-shared receive queue (RQ) implementations, posted work requests (WRs) are completed in the order that they are posted. This allows efficient management of an RQ by software and fetching of multiple WQEs using a single DMA operation by the adapter. In SRQ implementations, on the other hand, WRs are not necessarily completed in order they have been posted. Different WQEs are consumed by different connections, and connections may vary by their respective reception rate and the message size. Consequently, work requests may be completed out of order. A result of such an implementation is that an SRQ location can be consumed by a non-completed WQE due to the our-of-order WQE completion—an undesirable effect referred to as "head-of-line blocking."

To alleviate head-of-line blocking, a linked list approach may be implemented. In this approach, each WQE points to the next WQE in the SRQ. WQEs are added to the tail of the list and can be removed from the middle of the list. However, this approach leads to the discontinuous placement of WQEs in the memory and prevents efficient multiple WQE fetches by the adapter.

It would be advantageous to provide an improved mechanism for posting and retrieving WQEs to a shared receive queue. It would be further advantageous to provide a mechanism for allowing non-sequential entry postings in an SRQ. It would be further advantageous to provide a mechanism for non-sequentially retrieving WQEs from an SRQ.

SUMMARY OF THE INVENTION

The present invention provides a method, computer program product, and a data processing system for posting and retrieving WQEs to a shared receive queue in a manner that alleviates head-of-line blocking issues. The present invention provides a shared receive queue and a posting routine for allowing non-sequential work request postings in the shared receive queue. Additionally, a fetch routine is provided for non-sequential fetching of work queue elements from the shared receive queue.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

The present invention provides a network computing system having end nodes, switches, routers, and links interconnecting these components. The end nodes segment a message into packets and transmit the packets over the links. The switches and routers interconnect the end nodes and route the packets to the appropriate end node. The end nodes reassemble the packets into a message at the destination. With reference now to the figures and in particular with reference to FIG. 1, a diagram of a network computing system is illustrated in accordance with a preferred embodiment of the present invention. The network computing system represented in FIG. 1 takes the form of a system area network (SAN) 100 and is provided merely for illustrative purposes, and the embodiments of the present invention described below can be implemented on computer systems of numerous other types and configurations. For example, computer systems implementing the present invention can range from a small server with one processor and a few input/output (I/O) adapters to massively parallel supercomputer systems with hundreds or thousands of processors and thousands of I/O adapters. Furthermore, the present invention can be implemented in an infrastructure of remote computer systems connected by an internet or intranet.

Figure 1:
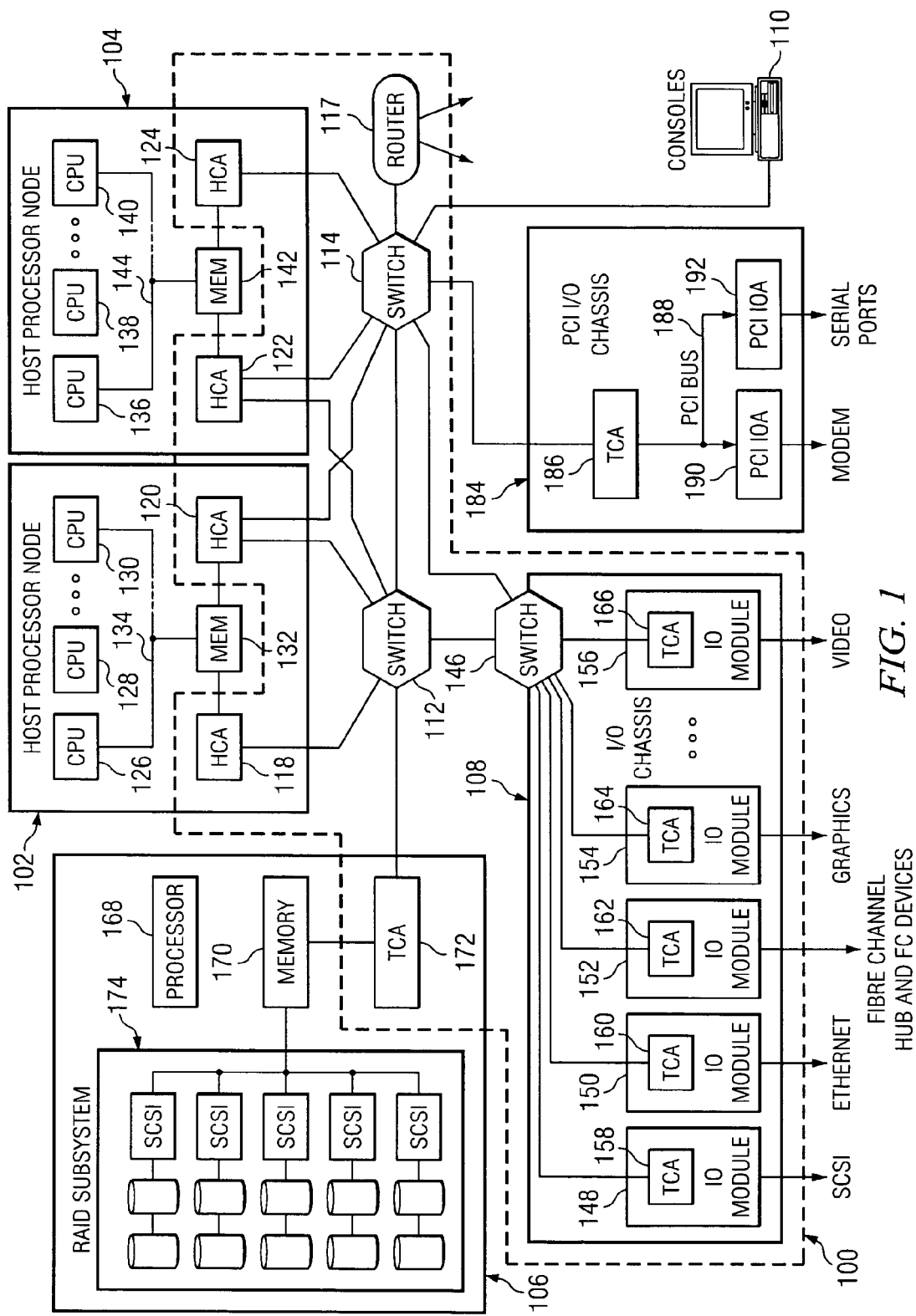
FIG. 1 is a diagram of a network computing system in which a which a data processing system featuring a shared receive queue may be implemented in accordance with a preferred embodiment of the present invention.

SAN 100 is a high-bandwidth, low-latency network interconnecting nodes within the network computing system. A node is any component attached to one or more links of a network and forming the origin and/or destination of messages within the network. In the depicted example, SAN 100 includes nodes in the form of host processor node 102, host processor node 104, redundant array independent disk (RAID) subsystem node 106, I/O chassis node 108, and PCI I/O Chassis node 184. The nodes illustrated in FIG. 1 are for illustrative purposes only, as SAN 100 can connect any number and any type of independent processor nodes, I/O adapter nodes, and I/O device nodes. Any one of the nodes can function as an endnode, which is herein defined to be a device that originates or finally consumes messages or frames in SAN 100.

SAN 100 contains the communications and management infrastructure supporting both I/O and interprocessor communications (IPC) within a network computing system. The SAN 100 shown in FIG. 1 includes a switched communications fabric, which allows many devices to concurrently transfer data with high-bandwidth and low latency in a secure, remotely managed environment. Endnodes can communicate over multiple ports and utilize multiple paths through the SAN fabric. The multiple ports and paths through the SAN shown in FIG. 1 can be employed for fault tolerance and increased bandwidth data transfers.

The SAN 100 in FIG. 1 includes switch 112, switch 114, switch 146, and router 117. A switch is a device that connects multiple links together and allows routing of packets from one link to another link within a subnet using a small header Destination Local Identifier (DLID) field. A router is a device that connects multiple subnets together and is capable of routing frames from one link in a first subnet to another link in a second subnet using a large header Destination Globally Unique Identifier (DGUID).

In one embodiment, a link is a full duplex channel between any two network fabric elements, such as endnodes, switches, or routers. Example suitable links include, but are not limited to, copper cables, optical cables, and printed circuit copper traces on backplanes and printed circuit boards.

For reliable service types, endnodes, such as host processor endnodes and I/O adapter endnodes, generate request packets and return acknowledgment packets. Switches and routers pass packets along from the source to the destination. Except for the variant CRC trailer field which is updated at each stage in the network, switches pass the packets along unmodified. Routers update the variant CRC trailer field and modify other fields in the header as the packet is routed.

In SAN 100 as illustrated in FIG. 1, host processor node 102, host processor node 104, RAID I/O subsystem 106, I/O chassis 108, and PCI I/O Chassis 184 include at least one channel adapter (CA) to interface to SAN 100. In one embodiment, each channel adapter is an endpoint that implements the channel adapter interface in sufficient detail to source or sink packets transmitted on SAN fabric 100. Host processor node 102 contains channel adapters in the form of host channel adapter 118 and host channel adapter 120. Host processor node 104 contains host channel adapter 122 and host channel adapter 124. Host processor node 102 also includes central processing units 126-130 and a memory 132 interconnected by bus system 134. Host processor node 104 similarly includes central processing units 136-140 and a memory 142 interconnected by a bus system 144.

Host channel adapter 118 provides a connection to switch 112, host channel adapters 120 and 122 provide a connection to switches 112 and 114, and host channel adapter 124 provides a connection to switch 114.

In one embodiment, a host channel adapter is implemented in hardware. In this implementation, the host channel adapter hardware offloads much of central processing unit and I/O adapter communication overhead. This hardware implementation of the host channel adapter also permits multiple concurrent communications over a switched network without the traditional overhead associated with communicating protocols. In one embodiment, the host channel adapters and SAN 100 in FIG. 1 provide the I/O and interprocessor communications (IPC) consumers of the network computing system with zero processor-copy data transfers without involving the operating system kernel process, and employs hardware to provide reliable, fault tolerant communications.

As indicated in FIG. 1, router 117 is coupled to wide area network (WAN) and/or local area network (LAN) connections to other hosts or other routers.

The I/O chassis 108 in FIG. 1 includes a switch 146 and multiple I/O modules 148-156. In these examples, the I/O modules take the form of adapter cards. Example adapter cards illustrated in FIG. 1 include a SCSI adapter card for I/O module 148; an adapter card to fiber channel hub and fiber channel-arbitrated loop (FC-AL) devices for I/O module 152; an Ethernet adapter card for I/O module 150; a graphics adapter card for I/O module 154; and a video adapter card for I/O module 156. Any known type of adapter card can be implemented. I/O adapters also include a switch in the I/O adapter backplane to couple the adapter cards to the SAN fabric. These modules contain target channel adapters 158-166.

In this example, RAID subsystem node 106 in FIG. 1 includes a processor 168, a memory 170, a target channel adapter (TCA) 172, and multiple redundant and/or striped storage disk unit 174. Target channel adapter 172 can be a fully functional host channel adapter.

PCI I/O chassis node 184 includes a TCA 186 and multiple PCI Input/Output Adapters (IOA) 190-192 connected to TCA 186 via PCI bus 188. In these examples, the IOAs take the form of adapter cards. Example adapter cards illustrated in FIG. 1 include a modem adapter card 190 and serial adapter card 192. TCA 186 encapsulates PCI transaction requests or responses received from PCI IOAs 190-192 into data packets for transmission across the SAN fabric 100 to an HCA, such as HCA 118. HCA 118 determines whether received data packets contain PCI transmissions and, if so, decodes the data packet to retrieve the encapsulated PCI transaction request or response, such as a DMA write or read operation. HCA 118 sends it to the appropriate unit, such as memory 132. If the PCI transaction was a DMA read request, the HCA then receives the response from the memory, such as memory 132, encapsulates the PCI response into a data packet, and sends the data packet back to the requesting TCA 186 across the SAN fabric 100. The TCA then decodes the PCI transaction from the data packet and sends the PCI transaction to PCI IOA 190 or 192 across PCI bus 188.

Similarly, store and load requests from a processor, such as, for example, CPU 126, to a PCI IOA, such as PCI IOA 190 or 192 are encapsulated into a data packet by the HCA 118 for transmission to the TCA 186 corresponding to the appropriate PCI IOA 190 or 192 across SAN fabric 100. The TCA 186 decodes the data packet to retrieve the PCI transmission and transmits the PCI store or load request and data to PCI IOA 190 or 192 via PCI bus 188. If the request is a load request, the TCA 186 then receives a response from the PCI IOA 190 or 192 which the TCA encapsulates into a data packet and transmits over the SAN fabric 100 to HCA 118 which decodes the data packet to retrieve the PCI data and commands and sends the PCI data and commands to the requesting CPU 126. Thus, PCI adapters may be connected to the SAN fabric 100 of the present invention.

SAN 100 handles data communications for I/O and interprocessor communications. SAN 100 supports high-bandwidth and scalability required for I/O and also supports the extremely low latency and low CPU overhead required for interprocessor communications. User clients can bypass the operating system kernel process and directly access network communication hardware, such as host channel adapters, which enable efficient message passing protocols. SAN 100 is suited to current computing models and is a building block for new forms of I/O and computer cluster communication. Further, SAN 100 in FIG. 1 allows I/O adapter nodes to communicate among themselves or communicate with any or all of the processor nodes in network computing system. With an I/O adapter attached to the SAN 100, the resulting I/O adapter node has substantially the same communication capability as any host processor node in SAN 100.

Figure 2:
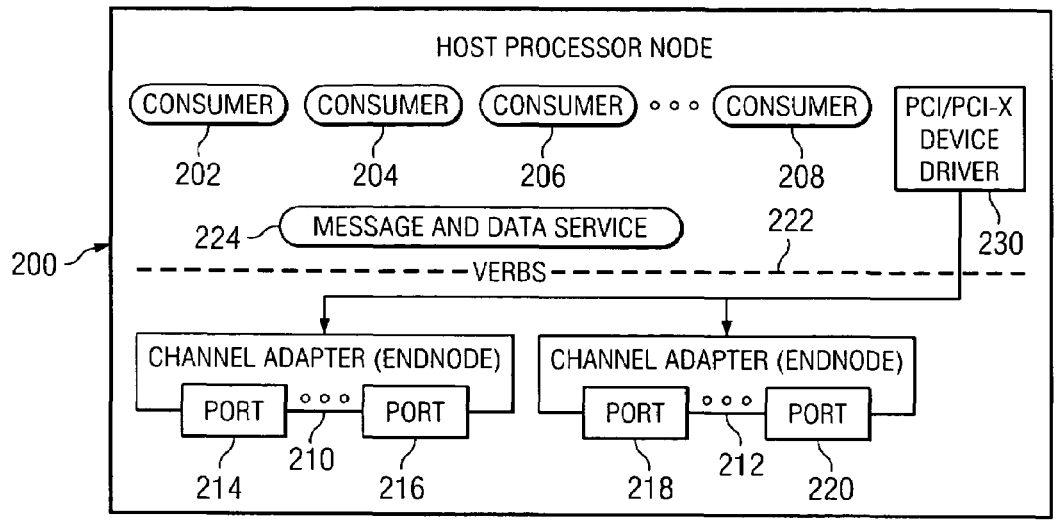
FIG. 2 is a functional block diagram of a host processor node that may be deployed in the network computing system of FIG. 1 in accordance with a preferred embodiment of the present invention.

Turning next to FIG. 2, a functional block diagram of a host processor node is depicted in accordance with a preferred embodiment of the present invention. Host processor node 200 is an example of a host processor node, such as host processor node 102 in FIG. 1. In this example, host processor node 200 shown in FIG. 2 includes a set of consumers 202-208 and one or more PCI/PCI-X device drivers 230, which are processes executing on host processor node 200. Host processor node 200 also includes channel adapter 210 and channel adapter 212. Channel adapter 210 contains ports 214 and 216 while channel adapter 212 contains ports 218 and 220. Each port connects to a link. The ports can connect to one SAN subnet or multiple SAN subnets, such as SAN 100 in FIG. 1. In these examples, the channel adapters take the form of host channel adapters.

Consumers 202-208 transfer messages to the SAN via the verbs interface 222 and message and data service 224. A verbs interface is essentially an abstract description of the functionality of a host channel adapter. An operating system may expose some or all of the verb functionality through its programming interface. Basically, this interface defines the behavior of the host. Additionally, host processor node 200 includes a message and data service 224, which is a higher level interface than the verb layer and is used to process messages and data received through channel adapter 210 and channel adapter 212. Message and data service 224 provides an interface to consumers 202-208 to process messages and other data. In addition, the channel adapter 210 and channel adapter 212 may receive load and store instructions from the processors which are targeted for PCI IOAs attached to the SAN. These bypass the verb layer, as shown in FIG. 2.

Figure 3:
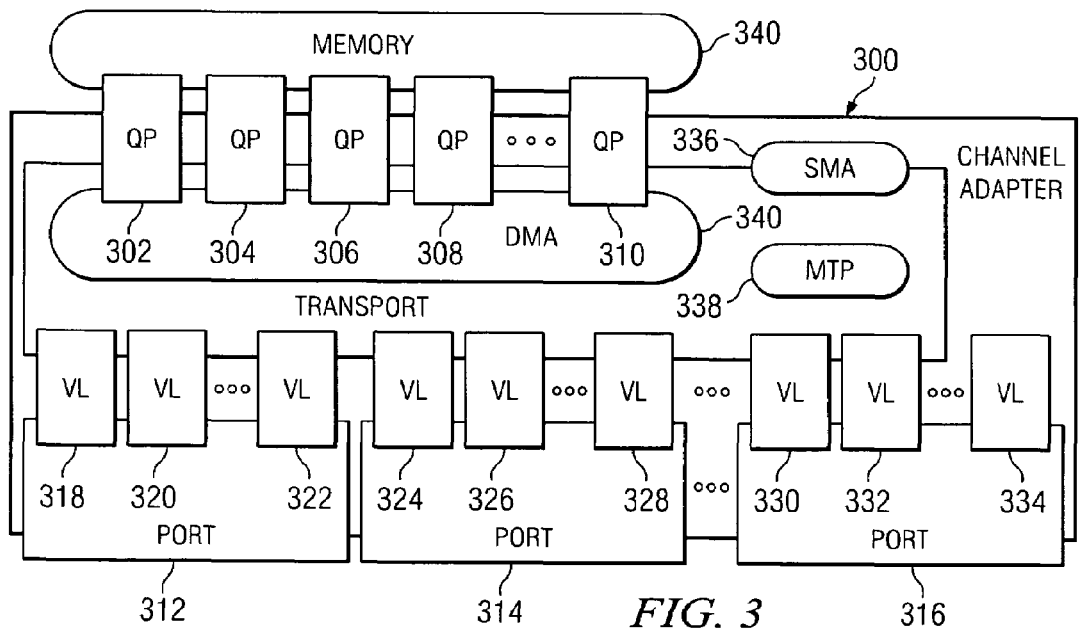
FIG. 3 is a diagram of a host channel adapter that may fetch work queue elements from a shared receive queue in accordance with a preferred embodiment of the present invention.

With reference now to FIG. 3, a diagram of a host channel adapter is depicted in accordance with a preferred embodiment of the present invention. Host channel adapter 300 shown in FIG. 3 includes a set of queue pairs (QPs) 302-310, which are one means used to transfer messages to the host channel adapter ports 312-316. Buffering of data to host channel adapter ports 312-316 is channeled through virtual lanes (VL) 318-334 where each VL has its own flow control. Subnet manager configures channel adapters with the local addresses for each physical port, i.e., the port's LID. Subnet manager agent (SMA) 336 is the entity that communicates with the subnet manager for the purpose of configuring the channel adapter. Memory translation and protection (MTP) 338 is a mechanism that translates virtual addresses to physical addresses and validates access rights. Direct memory access (DMA) 340 provides for direct memory access operations using memory 340 with respect to queue pairs 302-310.

A single channel adapter, such as the host channel adapter 300 shown in FIG. 3, can support thousands of queue pairs. By contrast, a target channel adapter in an I/O adapter typically supports a much smaller number of queue pairs.

Each queue pair consists of a send work queue (SWQ) and a receive work queue. The send work queue is used to send channel and memory semantic messages. The receive work queue receives channel semantic messages. A consumer calls an operating-system specific programming interface, which is herein referred to as verbs, to place work requests (WRs) onto a work queue.

Figure 4:
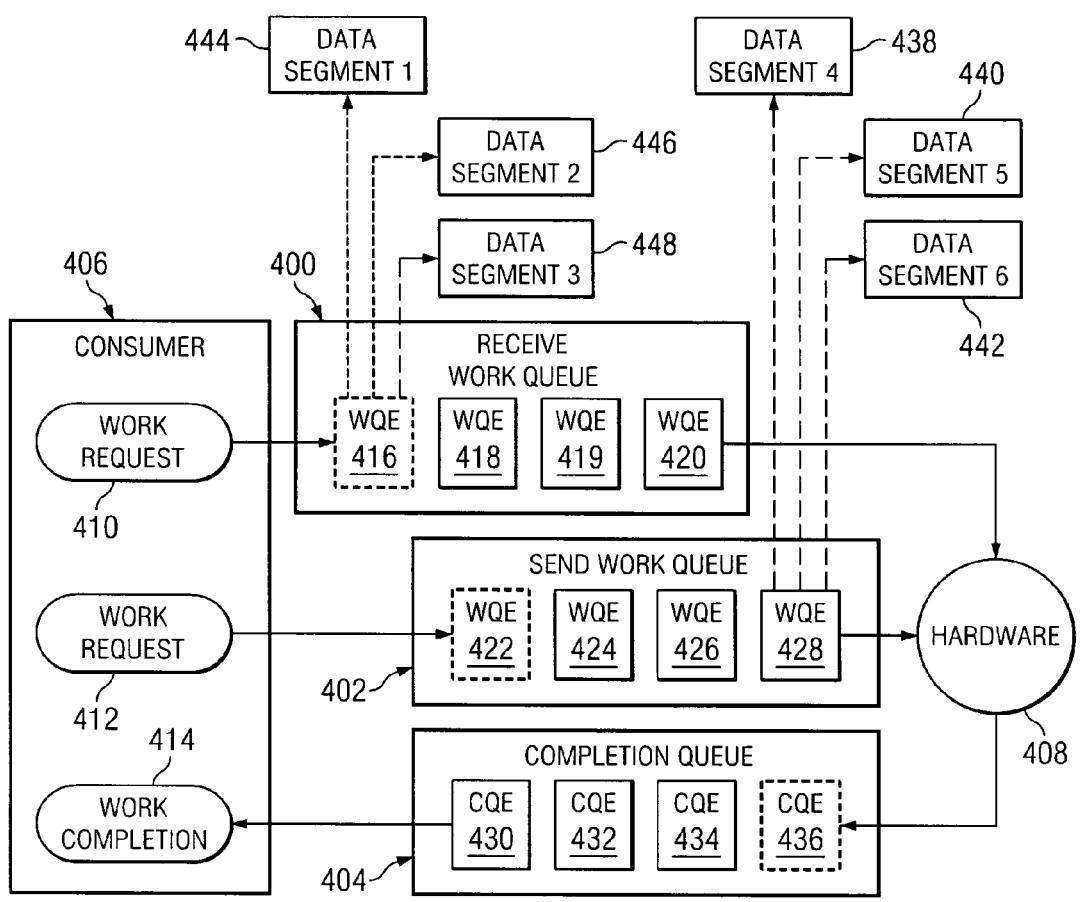
FIG. 4 is a diagram illustrating processing of work requests in accordance with a preferred embodiment of the present invention.

With reference now to FIG. 4, a diagram illustrating processing of work requests is depicted in accordance with a preferred embodiment of the present invention. In FIG. 4, a receive work queue 400, send work queue 402, and completion queue 404 are present for processing requests from and for consumer 406. These requests from consumer 406 are eventually sent to hardware 408. In this example, consumer 406 generates work requests 410 and 412 and receives work completion 414. As shown in FIG. 4, work requests placed onto a work queue are referred to as work queue elements (WQEs).

Send work queue 402 contains work queue elements (WQEs) 422-428, describing data to be transmitted on the SAN fabric. Receive work queue 400 contains work queue elements (WQEs) 416-420 describing where to place incoming channel semantic data from the SAN fabric. A work queue element is processed by hardware 408 in the host channel adapter.

The verbs also provide a mechanism for retrieving completed work from completion queue 404. As shown in FIG. 4, completion queue 404 contains completion queue elements (CQEs) 430-436. Completion queue elements contain information about previously completed work queue elements. Completion queue 404 is used to create a single point of completion notification for multiple queue pairs. A completion queue element is a data structure on a completion queue. This element describes a completed work queue element. The completion queue element contains sufficient information to determine the queue pair and specific work queue element that completed. A completion queue context is a block of information that contains pointers to, length, and other information needed to manage the individual completion queues.

Example work requests supported for the send work queue 402 shown in FIG. 4 are as follows. A send work request is a channel semantic operation to push a set of local data segments to the data segments referenced by a remote node's receive work queue element. For example, work queue element 428 contains references to data segment 4 438, data segment 5 440, and data segment 6 442. Each of the send work request's data segments contains a virtually contiguous memory region. The virtual addresses used to reference the local data segments are in the address context of the process that created the local queue pair.

A remote direct memory access (RDMA) read work request provides a memory semantic operation to read a virtually contiguous memory space on a remote node. A memory space can either be a portion of a memory region or portion of a memory window. A memory region references a previously registered set of virtually contiguous memory addresses defined by a virtual address and length. A memory window references a set of virtually contiguous memory addresses which have been bound to a previously registered region.

The RDMA read work request reads a virtually contiguous memory space on a remote endnode and writes the data to a virtually contiguous local memory space. Similar to the send work request, virtual addresses used by the RDMA read work queue element to reference the local data segments are in the address context of the process that created the local queue pair. For example, work queue element 416 in receive work queue 400 references data segment 1 444, data segment 2 446, and data segment 448. The remote virtual addresses are in the address context of the process owning the remote queue pair targeted by the RDMA read work queue element.

A RDMA write work queue element provides a memory semantic operation to write a virtually contiguous memory space on a remote node. The RDMA write work queue element contains a scatter list of local virtually contiguous memory spaces and the virtual address of the remote memory space into which the local memory spaces are written.

In accordance with a preferred embodiment of the present invention, receive work queue 400 is implemented as a shared receive work queue (SRQ). Accordingly, WQEs 416-420 may represent work queue elements of multiple connections. That is, WQEs 416-420 may respectively comprise memory semantic operations to write a virtually contiguous memory space on different remote nodes.

SRQ 400 is preferably implemented as one of more chained contiguous buffers and is managed as a unidirectional cyclic buffer, although other buffer algorithms may be suitably substituted therefor. Thus, for example, WQEs 416-420 may be representative of the most recently posted WQE (WQE 416) to the least recently posted WQE (WQE 420), at which time the buffer algorithm will post additional work requests to SRQ 400 by "wrapping around" to the beginning of SRQ 400. Each buffer of SRQ 400 may hold multiple WQEs thereby allowing fetch of multiple WQEs using a single DMA operation.

Each WQE 416-420 in SRQ 400 may be characterized in one of three states, namely: posted, in processing, and completed. As referred to herein, a posted WQE is a WQE that has been entered into SRQ 400 by a consumer but that has yet to be fetched for processing. An in processing WQE, as referred to herein, is a WQE that is being processed by hardware 408. A completed WQE, as referred to herein, is a WQE that has been processed by hardware 408 and that has a corresponding CQE posted in completion queue 404. Because WQEs 416-420 may be directed to different remote nodes, CQEs 430-436 that respectively correspond to one of completed WQEs of SRQ 400 may be out-of-order with respect to their associated WQE. For example, assume WQEs 419 and 420 are directed to different remote nodes. In the illustrative example, WQE 420 is posted to SRQ 400 prior to posting of WQE 419 to SRQ 400. However, WQE 419 may be completed prior to completion of WQE 420, for example due to a higher bandwidth connection between host channel adapter 300 and the remote node to which WQE 419 is directed relative to the connection between host channel adapter 300 and the remote node to which WQE 420 is directed, WQE 420 may comprise a more processor intensive work request with respect to WQE 419, target node latencies, or various other factors.

Figure 5A:
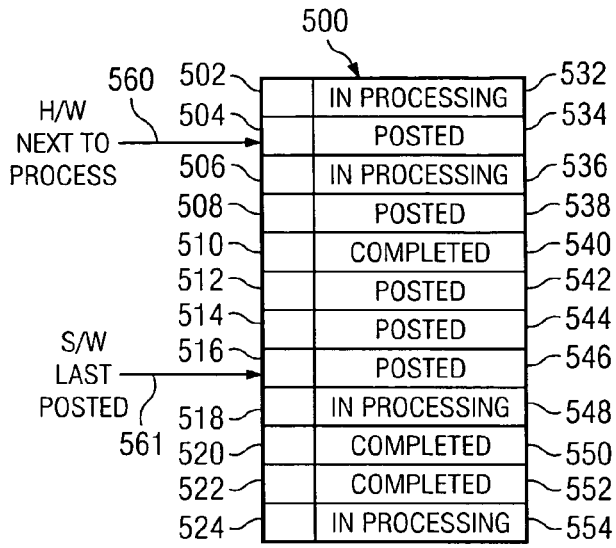
FIG. 5A is a diagrammatic illustration of a shared receive queue that allows non-sequential posting and fetching of work queue elements in accordance with a preferred embodiment of the present invention.

FIG. 5A is a diagrammatic illustration of a shared receive queue that allows fetch of multiple work queue elements in accordance with a preferred embodiment of the present invention. Shared receive queue 500 is an example of a shared receive queue, such as SRQ 400 shown in FIG. 4.

In the illustrative example, SRQ 500 comprises a plurality of entries 502-524 each having a respective WQE 502-524 written thereto. WRs are posted to SRQ by traversing entries in the SRQ until a suitable entry for posting a WQE is located. In the present example, queue entry 502 represents a head entry of SRQ 500, and queue entry 524 represents a tail entry of SRQ 500. The direction of cyclic SRQ 500 is illustratively designated as downward, that is from head SRQ entry 502 towards tail SRQ entry 524.

Each of WQEs 502-524 are shown with a corresponding state designation of posted, in processing, or completed. Particularly, WQEs 504 and 508-516 are posted, WQEs 502, 506, 518, and 524 are in processing, and WQEs 510, and 520-522 are completed.

As noted above, SRQ 500 is preferably implemented as a cyclic buffer. To this end, SRQ 500 entries are sequentially traversed from a queue head (entry 502) to a queue tail (entry 524) by software, e.g., consumer 406 shown in FIG. 4, when searching SRQ 500 for an entry to post a new WR into. Once the consumer reaches tail entry 554 of SRQ 500, the consumer returns to head entry 532 to continue traversal of SRQ 500.

Figure 5B:
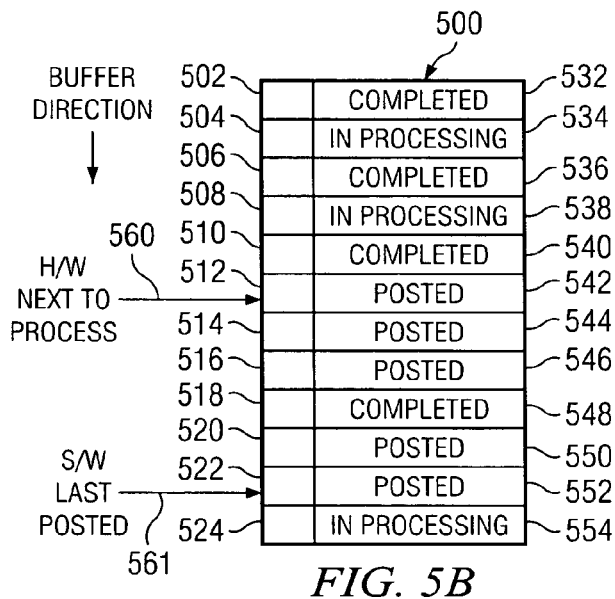
FIG. 5B is a diagrammatic illustration of the shared receive queue shown in FIG. 5A at a later time illustrating non-sequential posting and fetching of work queue elements in accordance with a preferred embodiment of the present invention.

In the illustrative example of FIG. 5A, WQE 516 is the most recently posted WQE in SRQ 500 as indicated by pointer 560. Additionally, WQE 504 is the next WQE to be fetched for processing by a hardware entity, e.g., hardware 408 shown in FIG. 4. Both software that posts WQE and hardware that fetches and processes WQEs preferably traverse SRQ 500 in the cyclic buffer direction as indicated by the down arrow designated "buffer direction." For example, FIG. 5B is a diagrammatic illustration of shared receive queue 500 at a later time with respect to that depicted in FIG. 5A. In FIG. 5B, the consumer has posted additional WQEs 520 and 522, and the hardware has fetched WQEs 504 and 508 (as indicated by the in processing state of WQEs 504 and 508) and has progressed to WQE 512 for the next WQE to be fetched for processing.

Figure 6:
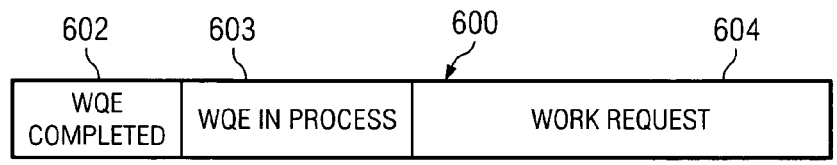
FIG. 6 is a diagrammatic illustration of a work queue element that includes a state indicator of the work queue element in accordance with a preferred embodiment of the present invention.

FIG. 6 is a diagrammatic illustration of a work queue element that includes a state indicator of the WQE in accordance with a preferred embodiment of the present invention. WQE 600 is an example of a work queue elements of an SRQ, such as work queue element 502 shown in FIG. 5. WQE 600 preferably includes a WQE Completed field 602 and a work request field 604. WQE Completed field 602 maintains an indicator of the status of a work request maintained in work request field 604. For example, WQE Completed field 602 may maintain a bit, or flag, having one of two possible values that each respectively indicate one of a completed or non-completed state of the corresponding work request maintained in work request field 604.

For example, WQE Completed Field 602 may have a bit-value 0 written thereto to indicate the work request maintained in work request field 604 is not completed and a bit-value 1 written thereto to indicate the work request maintained in work request field 604 is completed. Data in work request field 604 defines the work request, for example where to place incoming channel semantic data from the SAN fabric, or the like. Additionally, WQE 600 may optionally include WQE In Process field 603 that maintains an indicator of the in-process status of the work request maintained in work request field 604. For example, WQE In Process field 603 may include a bit or flag having one of two values that each respectively indicate one of an in process state or non-in process state of the corresponding work request maintained in work request field 604. For example, the in process field may indicate that the work request is in progress when asserted and that the work request is not in process when de-asserted. If WQE 600 is implemented without WQE In Processes field 603, the adapter preferably maintains an internal data structure for indicating whether work request elements are in process. For example, the adapter may include a linked list data structure that provides an in-process indication for each WQE of SRQ 500.

Additionally, WQE 600 may have an additional field to distinguish a posted WQE from WQEs that are in processing and completed. Alternatively, the adapter may maintain a data structure for indicating WQE posted states. In yet other embodiments, the posted status of a WQE may be deduced. For example, a WQE having completed and in process indicators both having false, i.e., non-asserted, values may be logically discerned as being posted but neither in process or completed.

Software, e.g., consumer 406 shown in FIG. 4, posts a new WR to SRQ 500 by locating a suitable SRQ entry. In accordance with a preferred embodiment of the present invention, software posts a work request to an entry containing a completed WQE. For example, software may sequentially traverse SRQ entries 502-524 until a WQE having a completed state is located. The software may then post the new WR to the located WQE by writing over the work request in work request field 604 with the new work request. To this end, the software is additionally responsible for updating the WQE completed state of the WQE.

Figure 7:
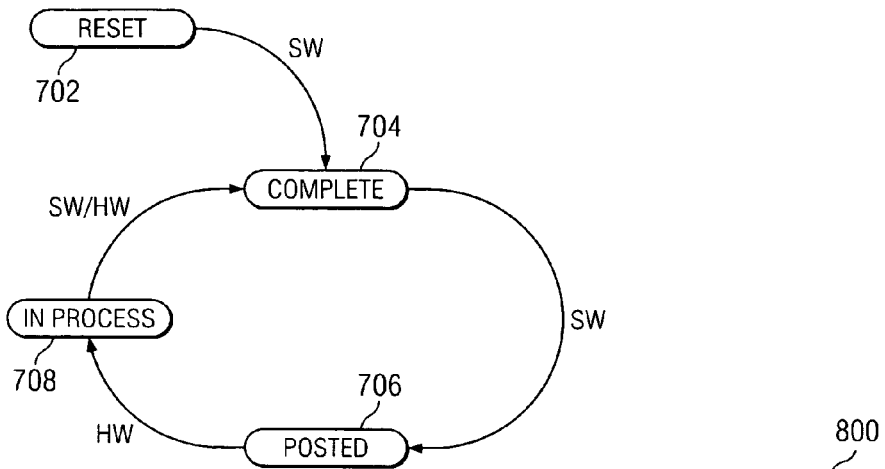
FIG. 7 is a state transition diagram depicting work queue element state transitions in accordance with a preferred embodiment of the present invention.

FIG. 7 is a state transition diagram depicting work queue element state transitions in accordance with a preferred embodiment of the present invention. Preferably, new WQEs may be posted to an SRQ entry only when a WQE that is currently in the SRQ entry is designated as completed. To this end, at initialization (step 702), or reset, of the shared receive queue, all WQEs are set to a completed state (step 704). Initialization of the WQEs to the completed state is preferably performed by software (SW) by, for example, asserting each WQE Completed field of each SRQ entry. The state of a WQE is changed to "posted" by software, e.g., a consumer, upon posting of a work request to the SRQ entry (step 706). To change the state of a WQE to posted from completed, the WQE Completed field is de-asserted by software.

Additionally, an optional WQE Posted field in the WQE or in a data structure maintained by the adapter may be asserted. However, de-assertion of the WQE Completed field (in conjunction with a de-asserted In Processing field) of the WQE is sufficient to indicate the WQE state as posted. When a posted WQE is fetched by hardware for processing, the hardware changes the WQE state to "in processing" (step 708). When processing of a WQE is completed, the state of the WQE is returned, either by software or the hardware that processed the WQE, to the 'completed' state according to step 704 by asserting the WQE Completed field of the WQE and de-asserting the WQE In Processing field of the WQE.

Figure 8:
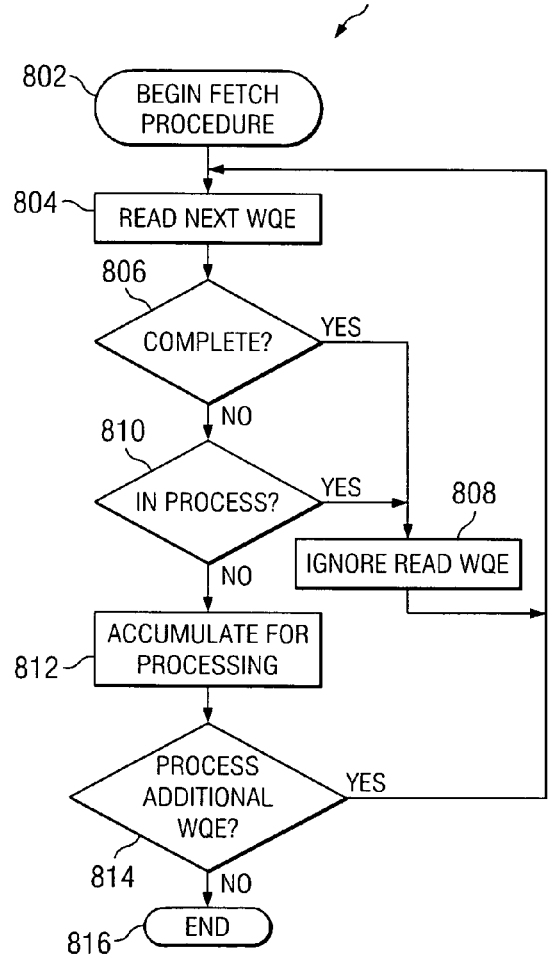
FIG. 8 is a flowchart of a non-sequential fetch routine for retrieving work requests from a shared receive queue in accordance with a preferred embodiment of the present invention.

FIG. 8 is a flowchart of a fetch routine for retrieving work requests from a shared receive queue in accordance with a preferred embodiment of the present invention. The fetch routine 800 is performed by hardware, e.g., hardware 408, and is implemented as computer readable instructions deployed on hardware 408 as software instructions, hardware instructions, firmware instructions, or a combination thereof.

The fetch routine 800 begins (step 802) and reads a WQE from the SRQ (step 804), such as SRQ 500 shown in FIG. 5A. Preferably, the adapter reads WQEs by traversing the SRQ in one directions, e.g., the direction of the logical cyclic buffer. For example, the adapter may read WQEs by initially setting a pointer to reference SRQ head entry 532 and sequentially progressing through the SRQ by performing increments to the pointer until reaching SRQ tail entry 554. The adapter then returns to the SRQ head to read additional WQEs by resetting the pointer to again reference SRQ head entry 532.

Once a WQE is read, an evaluation is then made to determine if the work request read from the SRQ has been completed (step 806). In the event the work request has previously been completed, the work request is ignored (step 808), and the routine proceeds to read the next work request according to step 804 by incrementing the pointer to reference the next SRQ entry. If the work request read at step 804 is not determined to be completed, an evaluation is made to determine if the work request is presently being processed (step 810). Various mechanisms for evaluating whether a work request is in process may be implemented. For example, the adapter may perform a write-back to the fetched WQE to determine if the WQE is in processing. In other embodiments, the adapter may read evaluate a WQE In Process field of the read WQE to determine if the WQE is currently being processed. Alternatively, if the WQE does not include a WQE In Process field, the adapter may maintain a data structure that stores a record of WQEs that are being processed and evaluate the data structure for an indication of whether the read WQE is in processing. For example, the adapter may maintain a record of WQEs in the SRQ and update the record of a WQE when processing of a work request is initiated and again when processing of a work request is completed.

If the work request is evaluated as in process at step 810, the fetch routine ignores the work request according to step 808, and the fetch routine then proceeds to read the next work request according to step 804. If the work request is not identified as in process at step 810, the fetch routine accumulates the work request for processing (step 812). Preferably, the fetch routine fetches WQEs by a RDMA operation and can thus accumulate more than one WQE for processing per fetch operation. Accordingly, an evaluation is then made to determine if additional work request are to be read for processing (step 814). If the fetch routine is to retrieve more work requests, the processing returns to step 804 to read an additional work request. If no additional work requests are to be read, the fetch routine cycle ends (step 816).

Thus, the present invention provides an improved mechanism for posting and retrieving WQEs to a shared receive queue in a manner that alleviates head-of-line blocking issues. The present invention provides a shared receive queue and a posting routine for allowing non-sequential entry postings in an SRQ. Additionally, a fetch routine is provided for non-sequential fetching of WQEs from the shared receive queue.

It Is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, and DVD-ROMs. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method that facilitates non-sequential posting and retrieving of work queue elements to and from a shared receive queue, the method comprising the computer implemented steps of:

including, in each one of the work queue elements, a first field for storing a first state indicator that indicates whether the work queue element is in a completed state;

including, in each one of the work queue elements, a second field for storing a second state indicator that indicates whether the work queue element is in an in-processing state;

including, in each one of the work queue elements, a third field for storing a third state indicator that indicates whether the work queue element is in a posted state;

wherein multiple work queue elements are in only one of the completed state, in-processing state, and posted state at a time;

generating, by a consumer, a first work queue element for posting to the shared receive queue, the queue including a plurality of entries;

sequentially traversing and evaluating the plurality of entries until a first entry is located that includes a second work queue element having a first state indicator that indicates that the second work queue element has completed processing; and responsive to locating the first entry, writing the first work queue element to the first entry.

2. The method of claim 1, further comprising:
for each one of the work queue elements:
transitioning the work queue element to the posted state when the work queue element is written to the shared receive queue;
transitioning the work queue element from the posted state to the in-processing state when hardware fetches the work queue element; and
transitioning the work queue element from the in-processing state to the completed state when the work queue element has completed.

3. The method of claim 1, further comprising:
responsive to writing the first work queue element, writing a value to the first state indicator included in the first work queue element that indicates that the first work queue element has not completed processing.

4. The method of claim 1, further comprising:
responsive to writing the first work queue element to the first entry, updating the third state indicator for the first work queue element to indicate that the first work queue element has posted.

5. The method of claim 1, wherein the step of sequentially traversing and evaluating is repeated until a tail entry of the plurality of entries is reached, the method further comprising referencing a head entry of the shared receive queue and repeating the traversing and evaluating steps until locating the first entry.

6. The method of claim 1, wherein the first entry comprises a head entry of the shared receive queue.

7. The method of claim 1, further comprising:
sequentially traversing and evaluating, by a hardware entity, the plurality of entries until a second entry is located that maintains a third work queue element that has a third state indicator that indicates that the third work queue element has been posted; and
responsive to locating the second entry, fetching the second work queue element for processing by the hardware entity.

8. The method of claim 7, further comprising:
responsive to fetching the third work queue element:
changing, by the hardware entity, a second state indicator included in the third work queue element to a value that indicates that the third work queue element is in processing; and
changing, by the hardware entity, a third state indicator included in the third work queue element to a value that indicates that the third work queue element is not posted.

9. The method of claim 8, further comprising:
responsive to fetching the third work queue element, processing the third work queue element; and
responsive to completion of processing of the third work queue element:
changing a first state indicator included in the third work queue element to a value that indicates that the third work queue element has completed processing; and
changing the second state indicator included in the third work queue element to indicate that the third work queue element is not in processing.

10. A computer program product, which is stored in a computer recordable-type medium, for facilitating non-sequential posting and retrieving of work queue elements to and from a shared receive queue, the computer program product comprising:

instructions for including, in each one of the work queue elements, a first field for storing a first state indicator that indicates whether the work queue element is in a completed state;

instructions for including, in each one of the work queue elements, a second field for storing a second state indicator that indicates whether the work queue element is in an in-processing state;

instructions for including, in each one of the work queue elements, a third field for storing a third state indicator that indicates whether the work queue element is in a posted state;

wherein multiple work queue elements are in only one of the completed state, in-processing state, and posted state at a time;

instructions for generating, by a consumer, a first work queue element for posting to the shared receive queue, the queue including a plurality of entries;

instructions that sequentially traverse and evaluate entries of the plurality of entries until a first entry is located that includes a second work queue element having a first state indicator that indicates that the second work queue element has completed processing; and instructions that, responsive to locating the first entry, write the first work queue element to the first entry.

11. The computer program product of claim 10,
for each one of the work queue elements:
instructions for transitioning the work queue element to the posted state when the work queue element is written to the shared receive queue;
instructions for transitioning the work queue element from the posted state to the in-processing state when hardware fetches the work queue element; and
instructions for transitioning the work queue element from the in-processing state to the completed state when the work queue element has completed.

12. The computer program product of claim 10, further comprising:

instructions that, responsive to writing the first work queue, write a value to the first state indicator included in the first work queue element that indicates that the first work queue element has not completed processing.

13. The computer program product of claim 12, responsive to writing the first work queue element to the first entry, instructions for updating the third state indicator for the first work queue element to indicate that the first work queue element has posted.

14. The computer program product of claim 10, wherein the instructions for sequentially traversing and evaluating are repeated until a tail entry of the plurality of entries is reached, and further comprising responsive to reaching the tail entry, instructions for referencing a head entry of the shared receive queue and repeatedly traversing and evaluating the plurality of entries until the first entry is located.

15. The computer program product of claim 10, wherein the first entry comprises a head entry of the shared receive queue.

16. The computer program product of claim 10, further comprising:

instructions for sequentially traversing and evaluating by a hardware entity the plurality of entries until a second entry is located that maintains a third work queue element that has a third state indicator that indicates that the third work queue element has been posted; and instructions for, responsive to locating the second entry, fetching the third work queue element of the second entry for processing by the hardware entity.

17. The computer program product of claim 16, further comprising:

instructions for, responsive to fetching the third work queue element, changing a second state indicator included in the third work queue element to a value that indicates that the third work queue element is in processing; and instructions for changing by the hardware entity, a third state indicator included in the third work queue element to a value that indicates that the third work queue element is not posted.

18. The computer program product of claim 17, further comprising:

instructions for, responsive to fetching the third work queue element, processing the third work queue element; and responsive to completing processing of the third work queue element:

instructions for changing a first state indicator included in the third work queue element to a value that indicates that the third work queue element has completed processing; and instructions for changing the second state indicator included in the third work queue element to indicate that the third work queue element is not in processing.

19. A data processing system for facilitating non-sequential posting and retrieving of work queue elements to and from a shared receive queue, comprising:

a channel adapter comprising the shared receive queue having a plurality of entries;

each one of the work queue elements including a first field for storing a first state indicator that indicates whether the work queue element is in a completed state;

each one of the work queue elements including a second field for storing a second state indicator that indicates whether the work queue element is in an in-processing state;

each one of the work queue elements including a third field for storing a third state indicator that indicates whether the work queue element is in a posted state;

wherein multiple work queue elements are in only one of the completed state, in-processing state, and posted state at a time;

a memory that contains a software entity and a set of instructions for writing work queue elements to the shared receive queue; and a processing unit that, responsive to execution of the set of instructions, generates, by a consumer, a first work queue element for posting to the shared receive queue that includes a plurality of entries; sequentially traverses and evaluates the plurality of entries until a first entry is located that includes a second work queue element having a first state indicator that indicates that the second work queue element has completed processing; and responsive to locating the first entry, writes the first work queue to the first entry.

20. The data processing system of claim 19, wherein, for each one of the work queue elements, the processing unit:

transitions the work queue element to the posted state when the work queue element is written to the shared receive queue;

transitions the work queue element from the posted state to the in-processing state when hardware fetches the work queue element; and transitions the work queue element from the in-processing state to the completed state when the work queue element has completed.

21. The data processing system of claim 19, wherein the processing unit repeats traversing and evaluating the plurality of entries until a tail entry of the plurality of entries is reached, wherein the processing unit references a head entry of the shared receive queue and repeats the traversing and evaluating steps until locating the first entry.

22. The data processing system of claim 19, wherein the hardware entity sequentially traverses and evaluates the plurality of entries until a second entry is located that maintains a third work queue element that has a third state indicator that indicates that the third work queue element has been posted, and wherein, responsive to locating the second entry, the hardware entity fetches the third work queue element of the second entry for processing.

23. The data processing system of claim 22, wherein responsive to fetching the third work queue element, the hardware entity: changes a second state indicator included in the third work queue element to a value that indicates that the third work queue element is in processing; and changes a third state indicator included in the third work queue element to a value that indicates that the third work queue element is not posted.

24. The data processing system of claim 22, wherein the hardware entity, responsive to fetching the third work queue element: processes the third work queue element, and wherein responsive to completing processing of the third work queue element by the hardware entity: a first state indicator included in the third work queue element is changed to a value that indicates that the third work queue element has completed processing; and the second state indicator that is included in the third work queue element is changed to indicate that the third work queue element is not in processing.

* * * * *